(12) United States Patent
Yadgar et al.

(10) Patent No.: US 10,290,853 B2
(45) Date of Patent: May 14, 2019

(54) PIT STOP FOR AND METHOD OF REPLACEMENT OF ELECTROLYTE

(71) Applicant: PHINERGY LTD

(72) Inventors: Avraham Yadgar, Kiryat Ono (IL); Yisrael Miller, Bat Ayin (IL); Dekel Tzidon, Hod Hasharon (IL); Aviv Tzidon, Tel Aviv (IL)

(73) Assignee: Phinergy Ltd., Lod (IL)

( * ) Notice: Subject to any disclaimer, the term of this patent is extended or adjusted under 35 U.S.C. 154(b) by 0 days.

(21) Appl. No.: 15/123,658

(22) PCT Filed: Mar. 4, 2015

(86) PCT No.: PCT/IL2015/050233
§ 371 (c)(1),
(2) Date: Sep. 5, 2016

(87) PCT Pub. No.: WO2015/132789
PCT Pub. Date: Sep. 11, 2015

(65) Prior Publication Data
US 2017/0077488 A1    Mar. 16, 2017

Related U.S. Application Data

(60) Provisional application No. 61/948,080, filed on Mar. 5, 2014, provisional application No. 61/973,315, filed on Apr. 1, 2014.

(51) Int. Cl.
*H01M 2/36* (2006.01)
*H01M 12/06* (2006.01)
(Continued)

(52) U.S. Cl.
CPC ............. *H01M 2/362* (2013.01); *B60L 53/80* (2019.02); *B60L 58/27* (2019.02); *H01M 2/364* (2013.01);
(Continued)

(58) Field of Classification Search
CPC ...... H01M 12/06; H01M 2/362; H01M 2/364; H01M 6/5077; H01M 6/5038
See application file for complete search history.

(56) References Cited

U.S. PATENT DOCUMENTS 3,847,671 A   11/1974 Leparulo et al.
5,121,044 A   6/1992 Goldman
(Continued)

FOREIGN PATENT DOCUMENTS

DE   10 2011 083165   3/2013
DE   10 2012 212384   1/2014
(Continued)

OTHER PUBLICATIONS

Supplementary European Search Report of EP Application No. 15 75 7802 dated Oct. 18, 2017.
(Continued)

*Primary Examiner* — Muhammad S Siddiquee
(74) *Attorney, Agent, or Firm* — Pearl Cohen Zedek Latzer Baratz LLP (57) ABSTRACT

Aspects of the invention are related to a system for replacing electrolyte in a battery. The system comprising: a first tank for holding off-board electrolyte and a second tank for receiving on-board electrolyte. The system further includes fluid conduits to connect the first tank and the second tank to the battery and a controller to control transfer of the on-board electrolyte from the battery to the second tank and to control transfer of off-board electrolyte from the first tank to the battery.

11 Claims, 3 Drawing Sheets

(51) Int. Cl.
- *H01M 6/50* (2006.01)
- *H01M 8/18* (2006.01)
- *B60L 53/80* (2019.01)
- *B60L 58/27* (2019.01)

(52) U.S. Cl.
CPC ......... *H01M 6/5077* (2013.01); *H01M 8/188* (2013.01); *H01M 12/06* (2013.01); *B60L 2240/545* (2013.01); *B60L 2260/56* (2013.01); *H01M 6/5038* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(56) References Cited

U.S. PATENT DOCUMENTS

| | | | |
|---|---|---|---|
| 5,208,526 A * | 5/1993 | Goldman | H01M 4/02 320/128 |
| 5,405,713 A | 4/1995 | Pecherer et al. | |
| 5,849,427 A * | 12/1998 | Siu | H01M 12/06 429/404 |
| 6,296,958 B1 | 10/2001 | Pinto et al. | |
| 6,384,569 B1 * | 5/2002 | Pintz | H01M 6/5077 320/101 |
| 6,926,958 B2 | 8/2005 | Kinoshita et al. | |
| 2003/0091503 A1 | 5/2003 | Rosenfeld | |
| 2006/0127731 A1 | 6/2006 | Faris | |
| 2012/0021303 A1 | 1/2012 | Amendola et al. | |
| 2013/0285597 A1 * | 10/2013 | Goldstein | H02J 7/0052 320/107 |
| 2015/0211684 A1 * | 7/2015 | Santos | F17C 5/06 137/1 |

FOREIGN PATENT DOCUMENTS

| | | |
|---|---|---|
| JP | 1976015126 | 2/1976 |
| JP | 1987021033 | 1/1987 |
| JP | 1996505730 | 6/1996 |
| JP | 2005 197052 | 7/2005 |
| JP | 2010244731 | 10/2010 |
| WO | WO 92/02964 | 2/1992 |
| WO | WO 98/16402 | 4/1998 |
| WO | WO 2013/017901 | 2/2013 |
| WO | WO 2013128445 | 9/2013 |
| WO | WO 2013150521 | 10/2013 |
| WO | WO 2015004663 | 1/2015 |

OTHER PUBLICATIONS

International Search Report of Application No. PCT/IL2015/050233 dated Jun. 23, 2015.

Japanese Office Action of Application No. 2016-555503 dated Dec. 18, 2018.

* cited by examiner

PIT STOP FOR AND METHOD OF REPLACEMENT OF ELECTROLYTE

CROSS-REFERENCE TO RELATED APPLICATIONS

This application is a National Phase Application of PCT International Application No. PCT/IL2015/050233, International Filing Date Mar. 4, 2015, entitled "Pit Stop for and Method of Replacement of Electrolyte", published on Sep. 11, 2015 as International Patent Application Publication No. WO 2015/132789, claiming the benefit of U.S. Provisional Patent Application No. 61/948,080 filed Mar. 5, 2014 and U.S. Provisional Patent Application No. 61/973,315 filed Apr. 1, 2014, all of which are incorporated herein by reference in their entirety.

BACKGROUND OF THE INVENTION

Metal-Air electrical cells are known in the art. Such Metal-Air cell or battery includes a metal anode, made of materials including for example, aluminum, zinc, lithium, beryllium, calcium, or the like and a gas diffusion cathode. The chemical reaction that produces electricity in the battery is oxidation of the metal anode in the presence of an electrolyte, either aqueous or non-aqueous. The electrolyte is used for transferring ions between the cathode and anode. In some cases, the electrolyte may also be used for washing away the products of the reaction (i.e., the metal's oxides) which are coating the anode, thus allowing the oxidation reaction of the anode to continue and the battery to supply electricity.

As the reaction proceeds, the amount of reaction products in the electrolyte grows, the electrolyte degrades and the electrolyte must be replaced with a new electrolyte. One by products of the reaction is heat. The oxidation reaction is an exothermic reaction that increases the temperature of the electrolyte. The efficiency of the battery depends on the temperature of the electrolyte. For example, optimal electrolyte temperature range for efficient operation an Al-air battery is 50-80° C. Therefore, it is beneficiary to start the operation of the metal-air battery at the optimal electrolyte temperature range and to maintain the temperature of the electrolyte within that range. A metal air battery may be assembled in a vehicle, or in a stationary apparatus such as Uninterruptible Power Supply (UPS), a remote off-grid site, or a generator.

SUMMARY

Aspects of the invention may be related to a system for replacing electrolyte in a battery. The system may include a first tank for holding off-board electrolyte and a second tank for receiving on-board electrolyte. The system may further include a fluid conduits to connect first tank and the and the second tank to the battery and a controller to control transfer of the on-board electrolyte from the battery to the second tank and to control transfer of off-board electrolyte from the first tank to the battery.

Additional aspects of the invention may be directed to a method for replacing electrolyte in a battery. The method may include: examining a property of an on-board electrolyte in a metal-air battery and when the property is below a first threshold value of the property, replacing the on-board electrolyte with an off-board electrolyte. Replacing the on-board electrolyte may include: transferring the on-board electrolyte from the metal-air battery to a second tank included in a system for replacing electrolyte in a battery and transferring the off-board electrolyte from a first tank included in the system for replacing electrolyte in a battery, to the meta-air battery.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", allocating, "checking", "receiving", "selecting", "comparing", "reporting", "recording", "detecting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

As used herein, the term "storage unit" may refer to any apparatus, device, system and/or array of devices that is configured to store data, for example, video recordings. The storage unit may include a mass storage device, for example Secure Digital (SD) cards, an optical storage device such as a CD, a DVD, or a laser disk; a magnetic storage device such as a tape, a hard disk, Redundant Array of Independent Disks (RAID), Direct-Attached Storage (DAS), Storage Area Network (SAN), a Network Attached Storage (NAS), or the like. Each of the storage units may include the ability to write data to the storage and read the data from the storage unit for further use, e.g., video files may be read from the storage unit, upon a request, for example, when an investigation of an incident is required.

The storage units may be physically located in the organization facility(ies), for example, a plurality of hard disks physically located in the IT storage room, or may be available to the organization via a network connection, for example, Storage Area Network (SAN) or Network Attached Storage (NAS).

Some aspects of the present invention may be related to a system and a method for replacement of electrolyte in a metal-air battery, for example, a meta-air battery assembled in a vehicle or in any other apparatus. The electrolyte in the battery or in a tank associated with the battery may be in at least two states: a used electrolyte that has already participate in the oxidation reaction or a new electrolyte that has not yet participate in the oxidation reaction. Both the used and the new electrolytes included in the battery or a tank associated with the battery may be regarded herein as "on-board" electrolyte. A system (e.g., a service station) according to some embodiments of the invention may replace an on-board electrolyte with electrolyte stored in at least one tank associate with the system. Such an electrolyte may be referred herein as "off-board" electrolyte.

According to embodiments of the invention an on-board electrolyte may be replaced under at least two different circumstances. A used on-board electrolyte may be replaced by a new off-board electrolyte when the concentration of alkalinity (e.g., ions) in the electrolyte drops below a threshold value, slowing in chemical reaction rate and further that the amounts of undesired reaction products in the electrolyte increases above a second threshold, further slowing in chemical reaction rate.

In some embodiments, the electrolyte in the metal-air battery may be used as a thermal battery for preserving heat, for example, for heating the vehicles' passenger cabin or other components of the electric vehicle such as the driver's seat or the main battery (e.g., the lithium battery). The electrolyte in the tank may be pre-heated or may be introduced into the battery or the tank associated with the battery at a desired temperature range, for example, between 30-100° C. or between 50-80° C. The desired temperature may be determined according to the desired use. For example, when the electrolyte is to be used as a heat accumulating liquid for the use in a thermal battery, the off-board electrolyte may be heated to relatively high temperatures e.g., above 80° C. In yet another example, when the electrolyte is to be used in a chemical reaction in the metal-air battery (and optionally also as heat accumulating liquid) the electrolyte may be heated to the optimal operation temperature range of the metal-air battery, e.g., 50-80° C. for Al-air battery. The cold on-board electrolyte, either used or unused, may be replaced in a service station according to embodiments of the invention with heated off-board electrolyte.

Figure 1:
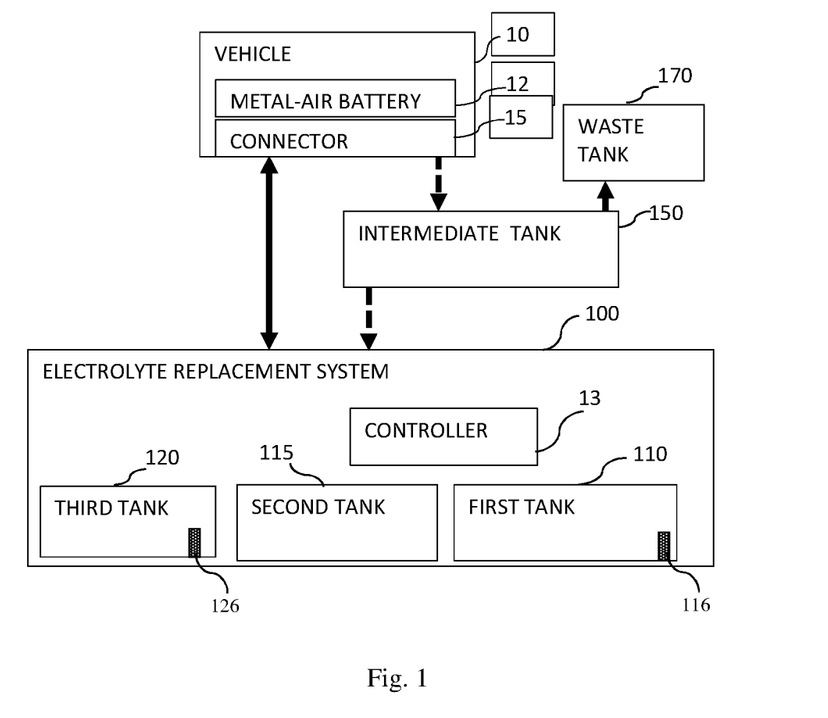
FIG. 1 is a high level block diagram of an exemplary service station for replacement of on-board electrolyte according to some embodiments of the invention.

The system may be either stationary or mobile and may serve various types of apparatuses that are powered or include at least one metal-air battery. The system my serve more than one battery or apparatus simultaneously. An apparatus 10, either mobile (e.g., an electric vehicle, or a hybrid vehicle) or stationary (e.g., an Uninterruptible Power Supply (UPS), a remote off-grid site, or a generator), that may be powered at least partially by a metal-air battery, is illustrated in FIG. 1. Such apparatus may enter a service station for replacing an on-board electrolyte or a mobile service station may be sent to that apparatus for replacing the on-board electrolyte. That apparatus may be connected via a connector included in the apparatus to a connecting pipe included in the electrolyte replacement system for replacement of the electrolyte according to some embodiments of the invention. After connecting the apparatus's connector to the connecting pipe a communication connection may be established between a controller associated with the metal-air battery of the apparatus and the replacement system's controller. The apparatus's controller may transmit, either by means of wired or wireless communication channel, information related to the status of the on-board electrolyte.

The metal-air battery in the apparatus may include one or more sensors for sensing a property of the electrolyte in the battery. For example, the metal-air battery may include a sensor for sensing the chemical composition of the electrolyte, the temperature of the electrolyte, the amount of solid particles in the electrolyte, the resistivity of the electrolyte, the pH of the electrolyte, the momentary amount of electrolyte in the battery, or the like. A controller included in the apparatus and associated with the metal-air battery may receive from the one or more sensor a value indicative of the property of the electrolyte in the battery. Following a connection of the apparatus to the service station, the controller associated with the metal-air battery may transmit the value to the service station's controller. The controller in the service station may determine if the electrolyte in the metal-air battery should be replaced. According to some embodiments the controller may further determine the value of the used electrolyte and the materials included in it, such as contaminants.

Reference is now made to FIG. 1, which illustrates a high level block diagram of an exemplary system 100, (e.g., a service station, a pit stop, etc.) for replacement of on-board electrolyte (e.g., used electrolyte or cold electrolyte (either used or unused)) according to some embodiments of the invention. System 100 may comprise first electrolyte tank 110, second electrolyte tank 115 and controller 130, as well as connecting means (electrolyte conduits, communication channel) to connect system 100 to a serviced metal-air battery 12. System 100 may be stationary or mobile and may serve both stationary and/or mobile apparatuses. System 100 may serve more than one apparatus or more than one metal-air batteries 12 included in a single or in multiple apparatuses, simultaneously. When apparatus 10 enters a service station comprising system 100, or when system 100 reaches apparatus 10, one or more metal-air batteries 12 may be connected to a system 100 via connector 15. System 100 may include at least one first tank 110 to contain off-board electrolyte, at least one second tank 115 to contain on-board electrolyte and at least one controller 130. System 100 may further include a third tank 120 and one or more intermediate tanks 150. Third tank 120 may hold a heated off-board electrolyte, heated to a predetermined temperature range.

Intermediate tank 150 may receive the on-board electrolyte from metal-air battery 12 prior to the delivery of the electrolyte to second tank 115. Tank 150 may include one or more sensors (not illustrated) to measure a property of the electrolyte in tank 150. For example, metal-air battery 12 may include a sensor for sensing the chemical composition of the electrolyte, the temperature of the electrolyte, the amount of solid particles in the electrolyte, the resistivity of the electrolyte, the pH of the electrolyte, the momentary amount of electrolyte in the battery, or the like. These measurements may be done in order to measure the amount of valuable materials in the on-board electrolyte that was taken out of the metal air battery, as well as to determine if there are contaminants in the used electrolyte, before adding it to the on-board electrolyte tank, where they may contaminate the electrolyte already in the tank. If the on-board electrolyte does not contain any valuable material or contains undesired materials that may contaminate or harm the on-board electrolyte in the second tank, the electrolyte from tank 150 may be delivered to a waste tank 170.

First tank 110 may hold off-board electrolyte (e.g., heated electrolyte, new electrolyte, etc.) to be delivered to metal-air battery 12. Tank 110 may be configured to hold corrosive electrolyte thus may be made or may be coated by corrosive resisting material. Second tank 115 may receive the on-board electrolyte from metal-air battery 12 of vehicle 10, or from intermediate tank 150. Tank 115 may be configured to hold corrosive liquids such as on-board electrolyte Tank 115 may be made or may be coated by corrosive resisting material.

System 100 may further include a controller 130 that may be configured to receive indication of the status of the on-board electrolyte in metal-air battery 12. Controller 130 may receive the indication from a computer or a controller included in apparatus 10 and associated with metal-air battery 12, for example, according to some embodiments, a controller that controls the operation of metal-air battery 12. The indication may be received either by wired or wireless communication. Controller 130 may further be configured to determine based on the received indication, if the electrolyte in metal-air battery 12 should be replaced (e.g., due to the chemical composition or the temperature of the on-board electrolyte). This measurements may also assist in measuring the temperature of the on-board electrolyte in the vehicle to determine if the on-board electrolyte is a cold on-board electrolyte (e.g., having a temperature below a predetermined threshold) and should be replaced with a heated off-board electrolyte.

Controller 130 may cause on-board electrolyte to flow from metal-air battery 12 to, for example, second tank 115 or intermediate electrolyte tank 150. Controller 130 may receive from a sensor located inside tank 150 indication of the status of the on-board electrolyte in tank 150. The controller may determine based on the received indication if the on-board electrolyte has high enough quality (e.g., a property of the electrolyte is above a first threshold value) and is not contaminated and thus can be delivered to second tank 115 or, if otherwise, it should be delivered to waste tank 170. Controller 130 may cause off-board electrolyte to flow from first tank 110 to metal-air battery 12 or intermediate electrolyte tank 150.

In some embodiment, system 100 may further include a third valve (not illustrated) to control transfer of on-board electrolyte from metal-air battery 12 to intermediate electrolyte tank 150 and a fourth valve (not illustrated) to control transfer of on-board electrolyte from intermediate electrolyte tank 150 to second tank 115, for example, on-board electrolyte has high enough quality and is not contaminated. In some embodiments, the system may further include a fifth valve (not illustrated) to control transfer of on-board electrolyte from intermediate electrolyte tank 150 to waste electrolyte tank 170, for example, when the on-board electrolyte has poor quality or is very contaminated.

Figure 2:
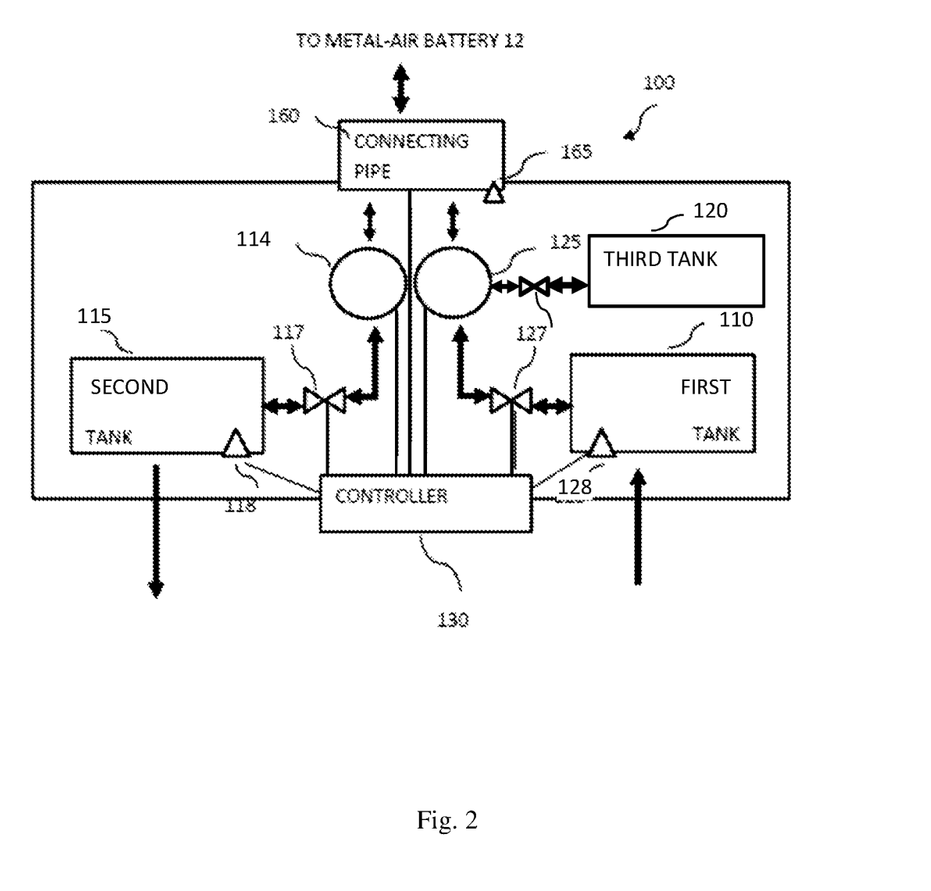
FIG. 2 is a high level block diagram of an exemplary system for replacement of on-board electrolyte in a metal-air battery according to some embodiments of the invention.

In some embodiments, the off-board electrolyte may be heated prior to the delivery to metal-air battery 12, to a predetermined temperature range. Off-board electrolyte may be heated in first tank 110 or may be heated in third thank 120. First tank 110 may include a heating element 116 and controller 130 may be configured to control the temperature of the off-board electrolyte to be in a predetermined temperature range. Additionally or alternatively system 100 may further include third tank 120 for holding heated off-board electrolyte. Third tank 120 may include a heating element 126 and controller 130 may be configured to control the temperature of the off-board electrolyte in the third tank to be in a predetermined temperature range. The predetermined range may be between 30-100° C., 50-80° C., at least 30° C., at least 50° C. or the like. Heating elements 116 and/or 126 may be any heating elements know in the art for heating liquids. Heating elements 116 and/or 126 may be powered by electricity from a grid. In some embodiments, controller 130 may cause heated off-board electrolyte to flow from first tank 110 and/or third tank 120 to metal-air battery 12. Reference is now made to FIG. 2, which illustrates a high level block diagram of an exemplary system 100 (also known as service station) for replacing of on-board electrolyte in a metal-air battery, in greater details, according to some embodiments of the invention. System 100 may include a first tank 110, a second tank 115 and at least one controller 130. System 100 may include a third tank 120 and an intermediate tank 150 illustrated in FIG. 1 and one or more connectors 160 each having a proper connecting sensor 165. System 100 may further include a first electrolyte pump 114, a first electrolyte valve 117, one or more electrolyte first sensors 118, a second electrolyte pump 125, a second electrolyte valve 127 and one or more second electrolyte sensors 128. System 100 may include a plurality of connecting pipes 160 for replacing, the on-board electrolyte, i.e., receiving on-board electrolyte and providing off-board electrolyte, for a plurality of metal-air batteries simultaneously. The hydraulic elements of system 100 may hydraulically be connected by pipes that are illustrated in bold lines. The electronic and control communication in system 100 is illustrated in thin lines.

Controller 130 may include any computation platform that may be configured to control system 100 according to code saved in a non-transitory memory associated with the controller, which when executed causes system 100 to perform methods according to the invention, and according to instructions received from a user using a user interface. Controller 130 may include a processor (e.g., a CPU, microcontroller, programmable logic controller (PLC) and the like), a non-transitory memory for storing codes that when executed by the processor perform methods according to embodiments of the invention, and a user interface (e.g., a graphical user interface) that may include any devices that allow a user to communicate with the controller.

When an apparatus such as apparatus 10 that includes a battery such as metal-air battery 12 communicates with controller 130, controller 130 may receive an indication that the on-board electrolyte in metal-air battery 12 should be replaced (e.g., too old or too cold). The controller may control pump 114 to pump the on-board electrolyte from metal-air battery 12 via connecting pipe 160 to second tank 115 or intermediate tank, such as intermediate tank 150 of FIG. 1 (not illustrated). Valve 117 may be controlled by controller 130 to control the flow of the on-board electrolyte to second tank 115 or intermediate tank 150. Sensor 118 may send controller 130 data related to a property of the on-board electrolyte in tank 115. For example, the chemical composition, the level of the electrolyte in tank 115, the temperature of the electrolyte, pH of the electrolyte, and the like.

Controller 130 may control pump 125 to pump off-board electrolyte (e.g., new electrolyte or heated electrolyte) from first tank 110 or third tank 120 to metal-air battery 12 via connecting pipe 160. Valve 127 may be controlled by controller 130 to control the flow of the new off board electrolyte from first tank 110 or control the flow of heated electrolyte from either first tank 110 or third tank 120. Sensor 128 may send controller 130 data related to the property of the off-board electrolyte in tank 110. For example, the chemical composition, the level of the electrolyte, the temperature or pH of the electrolyte and the like. Controller 130 may further send data representing the status and amount of new electrolyte being refilled in metal-air battery 12 to the controller of vehicle 10 controlling the operation of metal-air battery 12. Additional sensor (not illustrated) may send controller 130 data related to a property of the off-board electrolyte in tank 120, for example, the temperature of the off-board electrolyte. Sensor 118, 128 and the additional sensor may include: a thermometer, a pH sensor, a conductivity/resistivity sensor, or the like.

Controller 130 may further receive from sensor 165 an indication that the connection between connecting pipe 160 and connector 15 is sufficiently sealed to allow transfer of electrolyte. Sensor 165 may sense potential leakages in the connection between connecting pipe 160 and connector 15. For example, sensor 165 may sense a liquid leakage, gas leakage or the like. When an indication that a leakage has occurred is received by controller 130, the controller may cause pumps 115 and/or 125 to stop pumping, and the delivery of electrolyte between metal-air battery 12 and system 100 may be stopped.

Figure 3:
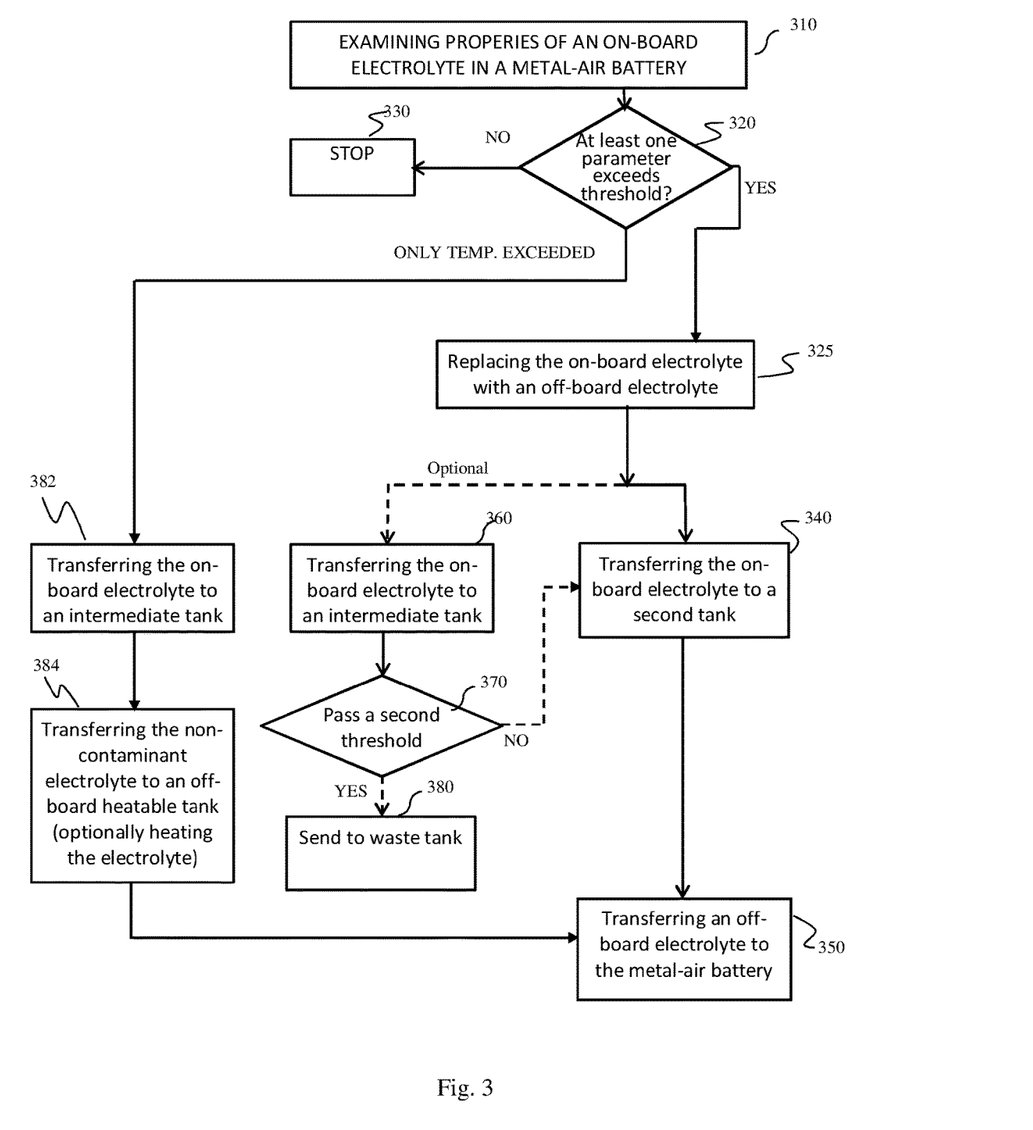
FIG. 3 is a flowchart of a method of replacing of on-board electrolyte in a metal-air battery according to some embodiments of the invention.

Reference is now made to FIG. 3, which illustrates a flowchart of a method of replacement of on-board electrolyte in a metal-air battery included in an electric vehicle (or hybrid vehicle) according to some embodiments of the invention. The method of FIG. 3 may be performed by system 100 or by any other system that is configured to replace an on-board electrolyte in metal-air battery with off-board electrolyte. In box 310, the method may include examining a property of an on-board electrolyte in a metal-air battery. A computing system of the apparatus comprising a metal-air battery (e.g., apparatus 10) may receive from one or more sensors located in or near the metal-air battery a value related to a property of the on-board electrolyte in the battery. The computing system of the apparatus may send the value to a controller included in a system for replacement of electrolytes (e.g., system 100). The controller (e.g., controller 130) may receive the value related to the property of the on-board electrolyte in the battery via wired or wireless communication. The property may include: the chemical composition of the electrolyte, the temperature of the electrolyte, the amount of solid particles in the electrolyte, the resistivity of the electrolyte, the pH of the electrolyte, the momentary amount of electrolyte in the battery, or the like.

In box 320, the method may include determining if at least one property parameter has been exceeded its respective threshold value. It will be noticed that the use of the term 'exceed' throughout this description means that a measured value, indicating a property, exceeded a respective threshold so that an action needs to be taken to fix this situation. The controller may compare a value or a parameter related to the property with a data stored in a memory or a storing device included in the controller. The data may include first threshold values for each of the related properties. When the value of at least one property exceeds its respective threshold value, the on-board electrolyte should be replaced [YES]. If the system detects that the only exceeded property is the temperature of the on-board electrolyte this means that all other properties of the on-board electrolyte are good and a special route is taken [ONLY TEMP. EXCEEDED]. For example, the temperature of the electrolyte lower than (i.e. exceeding) the threshold of 30-55° C. In this example if the temperature of the electrolyte is below this range (i.e. exceeds the threshold) it may be replaced. Yet, according to embodiments of the present invention, other parameters may be examined before a decision to replace the on-board electrolyte only due to its too low temperature will be taken, such as ambient temperature, the expected length of the next planned travel, etc. If no threshold was exceeded (i.e. the on-board electrolyte is good for further use) the process stops.

In case of ONLY TEMP. EXCEEDED the on-board electrolyte may be directed by the control system via an intermediate tank (such as tank 150 of FIG. 1) [box 382] to the off-board system (such as system 100 of FIG. 1) for heating it to a desired temperature [box 384]. When the electrolyte was heated to a desired temperature it may be returned to the metal-air battery (such as metal-air battery 12 of FIG. 1) [box 350]. In some embodiments, the multiple properties and their parameters that may be examined with respect to the on-board electrolyte may include examining both the temperature and the pH of the on-board electrolyte. In yet another example, the temperature, chemical composition and resistivity of the on-board electrolyte may be examined.

When the property exceeds (e.g., is below or above, as the case may be) the first threshold value of the property the method may include, in box 325, replacing the on-board electrolyte with an off-board electrolyte. In some embodiments, the method may include replacing the on-board electrolyte when at least one of the two or more properties is below the corresponding first threshold value. For example, the electrolyte may be replaced when the temperature of the on-board electrolyte is below 30° C. and the pH is below 12.

The electrolyte can be delivered or transferred to a second electrolyte tank, e.g., tank 115 or an intermediate electrolyte tank, e.g. tank 150, if the system includes such a tank. If a system (e.g., system 100) does not include an intermediate tank (box 340), the method may include transferring the on-board electrolyte to a second electrolyte tank, e.g., tank 115 included in system 100. The electrolyte may be pumped (e.g., by pump 114) from the metal air battery via a connector that connects the battery to the system for replacement of the electrolyte and transferred to the on-board electrolyte tank. Alternatively, if the values received from the sensor did not exceed the first threshold, the process may terminate (box 330).

In box 350, the method may include transferring the off-board electrolyte from a first tank included in the system for replacing electrolyte in a battery, to the meta-air battery. The off-board electrolyte may be pumped (e.g., by pump 125) from the first tank to the metal-air battery. In some embodiments, the off-board electrolyte may be a fresh (e.g., new) electrolyte having an optimized chemical composition.

In yet another embodiment, the off-board electrolyte may be heated electrolyte, heated to a predetermined temperature.

In some embodiments, the method may include heating the off-board electrolyte in the first tank to a predetermined temperature range prior to transferring the off-board electrolyte. For example, the off-board electrolyte may be heated in the first tank using a heating element (e.g., heating element 116) to a temperature range of 30-100° C. or 50-80° C. In some embodiments, the method may include heating an off-board electrolyte held in a third tank (e.g., tank 120 included in system 100) to a predetermined temperature range. For example, the off-board electrolyte may be heated in the third tank using a heating element (e.g., heating element 126) to a temperature range of 30-100° C. or 50-80° C. In some embodiments, the method may include transferring the heated off-board electrolyte from the third tank to the battery, for example, using pump 125.

If the system includes an intermediate tank (e.g., tank 150) the process may be performed according to the left side of the diagram along the dashed lines. The operation in box 360 may include transferring the on-board electrolyte from the metal air battery to an intermediate electrolyte tank, e.g., tank 150 included in system 100. The used electrolyte may be pumped from the metal-air battery via a connector connected to a connecting pipe included in the replacement system and be delivered to the intermediate tank.

In box 370, the method may include examining whether the property of the electrolyte is above a second threshold value (which may mean that it includes usable/valuable materials and is not too contaminated), or it should be directed to the waste tank. The controller may receive from sensors located in the intermediate tank, indication or indications regarding one or more properties of the on-board electrolyte, for example, the chemical composition of the on-board electrolyte. If the property exceeded a second threshold, the used electrolyte may be transferred to the second electrolyte tank, in box 340. If the indication did not exceed the second threshold, the used electrolyte may be transferred or delivered to the waste tank (e.g., tank 170), in box 380. For example, if the second indication shows that the amount of valuable material in the on-board electrolyte is above a desired threshold and/or the amount of undesired materials and contaminations is below a desired threshold value, the used electrolyte may be delivered to the second electrolyte tank.

In some embodiments, the method may include examining properties of on-board electrolytes each included in a metal-air battery. For example, two or more vehicle may enter a service station, such as system 100 following by an examination of the temperature of the on-board electrolyte in the metal-air battery in each vehicle. In some embodiments, the method may further include replacing each of the on-board electrolytes having the examined property below a corresponding threshold value with an off-board electrolyte. For example, if the temperatures of the on-board electrolytes in the two or more vehicle are below 30° C., both on-board electrolytes should be replaced.

In some embodiments, replacing the on-board electrolyte may include transferring each of the on-board electrolytes to a second tank (e.g., tank 115 included in system 100) and transferring an off-board electrolyte from a first tank (e.g., tank 110 included in system 100) to each of the batteries having an electrolyte with the examined property below the threshold value. Alternatively, the method may include transferring an off-board electrolyte (e.g., heated off-board electrolyte) from a third tank (e.g., tank 120 included in system 100) to each of the batteries having an electrolyte with the examined property below the threshold value.

In some embodiments, the method may further include receiving an indicator regarding the status of the connection between the vehicle and the system for replacement of the electrolyte. A sensor may be located in a connector included in the vehicle or in a connecting pipe included in the system of replacement of an electrolyte and may alert the system if a leakage occurred. The sensor may sense liquids leakage, gasses leakage or the like. If a leakage was detected the proses of transferring electrolyte may be stopped immediately.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for replacing electrolyte in a Metal-Air battery, comprising:
   a first tank for holding off-board electrolyte;
   an intermediate electrolyte tank;
   a waste electrolyte tank;
   a second tank for receiving on-board electrolyte;
   fluid conduits to connect the first tank and the second tank to the battery;
   a sensor to measure a property of the on-board electrolyte; and
   a controller to control transfer of the on-board electrolyte from the battery to the intermediate electrolyte tank or to the second tank, control transfer of the on-board electrolyte from the intermediate electrolyte tank to the second tank when the property of the on-board electrolyte exceeds a threshold and to transfer the on-board electrolyte to the waste electrolyte tank otherwise, and to control transfer of off-board electrolyte from the first tank to the battery,
   wherein the property is at least one of: a chemical composition of the on-board electrolyte, a temperature of the on-board electrolyte, an amount of solid particles in the on-board electrolyte, a resistivity of the on-board electrolyte, a pH of the on-board electrolyte and the momentary amount of on-board electrolyte in the battery, each having a corresponding threshold value.

2. A system according to claim 1, wherein the first tank includes a heating element and the controller is configured to control a temperature of the off-board electrolyte to be in a predetermined temperature range.

3. A system according to claim 1, further comprising a third tank for holding heated off-board electrolyte, wherein the third tank includes a heating element and the controller is configured to control a temperature of the off-board electrolyte in the third tank to be in a predetermined temperature range.

4. A system according to any of the preceding claims, further comprising a sensor to indicate if the connection of the conduits to the battery is safe.

5. A system according to any of the preceding claims, further comprising a communication unit to communicate with a controller of the battery to receive indication of the status of the electrolyte in the battery.

6. A system according to claim 4, wherein the controller is configured to prevent transfer of electrolyte between the system and the battery when the indication from the sensor is not "safe".

7. A system according to claim 1 wherein the controller is configured to transfer on-board electrolyte from the battery to the intermediate electrolyte tank for examination of the quality of the electrolyte according to the thresholds.

8. A system according to any one of the preceding claims, further comprising:
   a first valve controlling transfer of on-board electrolyte from the battery to the second tank;
   a second valve controlling transfer the off-board electrolyte from the first tank to the battery.

9. A system according to claim 3, further comprising:
   a first valve controlling transfer of cold on-board electrolyte from the battery to the second tank; and
   a second valve controlling transfer of heated off-board electrolyte from the third tank to the battery.

10. A system according to claim 1, further comprising:
    a third valve controlling transfer of on-board electrolyte from the battery to the intermediate electrolyte tank;
    a fourth valve controlling transfer of on-board electrolyte from the intermediate electrolyte tank to the second tank; and
    fifth valve controlling transfer of on-board electrolyte from the intermediate electrolyte tank to the waste electrolyte tank.

11. A system according to any of the preceding claims, further adapted to connect with more than one battery.

* * * * *